United States Patent
Ljung et al.

(10) Patent No.: US 10,893,086 B2
(45) Date of Patent: Jan. 12, 2021

(54) NODE TYPE BASED CONTROL OF ASSISTANCE FOR DATA STREAMING

(71) Applicant: Sony Mobile Communications Inc., Tokyo (JP)

(72) Inventors: Rickard Ljung, Helsingborg (SE); Peter Isberg, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/348,428

(22) PCT Filed: Nov. 10, 2016

(86) PCT No.: PCT/EP2016/077280
§ 371 (c)(1),
(2) Date: May 8, 2019

(87) PCT Pub. No.: WO2018/086695
PCT Pub. Date: May 17, 2018

(65) Prior Publication Data
US 2020/0084253 A1    Mar. 12, 2020

(51) Int. Cl.
*H04L 29/06* (2006.01)
*H04L 29/08* (2006.01)

(52) U.S. Cl.
CPC ............ *H04L 65/608* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,197,566 B1* | 3/2007 | Kuzma | ............... | H04L 65/4084 709/227 |
| 7,299,291 B1* | 11/2007 | Shaw | .................. | H04L 65/4069 709/203 |
| 2003/0063752 A1* | 4/2003 | Medvinsky | ......... | H04L 63/0457 380/279 |
| 2008/0222243 A1* | 9/2008 | Shaw | .................... | H04L 67/101 709/203 |
| 2012/0317235 A1* | 12/2012 | Nguyen | ............. | H04N 21/6375 709/219 |
| 2013/0297731 A1* | 11/2013 | Chan | ....................... | H04L 12/18 709/217 |
| 2013/0326024 A1* | 12/2013 | Chen | ................... | H04L 65/4084 709/219 |
| 2014/0359152 A1* | 12/2014 | Heng | .................... | H04L 65/602 709/231 |

(Continued)

OTHER PUBLICATIONS

International Search Report and Written Opinion from counterpart International Patent Application No. PCT/EP2016/077280 dated Jul. 17, 2017; 11 page.

(Continued)

*Primary Examiner* — Backhean Tiv
(74) *Attorney, Agent, or Firm* — Tucker Ellis LLP

(57) ABSTRACT

A streaming client (100) receives or sends information on a type of node of a node (110, 120, 130) for assisting streaming of data. Based on the information on the type of node, the streaming client selects the node to assist in streaming of data to the streaming client (100). The information on the type of node may be conveyed in a message transmitted from the streaming client (100) or in a message to the streaming client (100).

26 Claims, 5 Drawing Sheets

(56) References Cited

U.S. PATENT DOCUMENTS

| | | | |
|---|---|---|---|
| 2015/0109987 A1* | 4/2015 | Wang | H04W 4/06 |
| | | | 370/312 |
| 2015/0117264 A1* | 4/2015 | Kuo | H04L 65/4084 |
| | | | 370/255 |
| 2015/0200992 A1* | 7/2015 | Houdaille | H04L 51/14 |
| | | | 709/219 |
| 2015/0281746 A1* | 10/2015 | Lam | H04N 21/231 |
| | | | 725/116 |
| 2016/0248835 A1* | 8/2016 | Petrangeli | H04L 65/605 |
| 2016/0373546 A1* | 12/2016 | Lotfallah | H04L 67/02 |
| 2017/0093942 A1* | 3/2017 | Danielsson | H04N 21/25808 |
| 2017/0171579 A1* | 6/2017 | Liu | H04N 21/4345 |
| 2017/0187768 A1* | 6/2017 | Huang | H04L 67/2842 |
| 2018/0097864 A1* | 4/2018 | Brinkley | H04L 65/608 |
| 2018/0176613 A1* | 6/2018 | Gouache | H04N 21/23439 |
| 2018/0316740 A1* | 11/2018 | Stockhammer | H04L 65/608 |
| 2018/0332089 A1* | 11/2018 | Lohmar | H04L 65/4076 |
| 2020/0084253 A1* | 3/2020 | Ljung | H04L 67/02 |

OTHER PUBLICATIONS

"3rd Generation Partnership Project; Technical Specification Group Services and System Aspects; Study on Server and Network-assisted DASH (SAND) for 3GPP Multimedia Services (Release 14)"; TR26957_FS_Sand-V0.7.0-RM, 3GPP, Sep. 9, 2016.

"Information Technology—Dynamic adaptive streaming over HTTP (DASH)—Part 5: Service and network assisted DASH (SAND)", 29N154854, 3GPPP, Dec. 30, 2015.

* cited by examiner

NODE TYPE BASED CONTROL OF ASSISTANCE FOR DATA STREAMING

FIELD OF THE INVENTION

The present invention relates to methods for streaming data in a communication network and to corresponding devices and systems.

BACKGROUND OF THE INVENTION

In communication networks, it is known to deliver data by streaming. Delivery by streaming is often used for video and/or audio data, but may also be applied to other data, e.g., related to gaming, virtual reality, industrial control applications, or software updates. One type of technology which may be applied for this purpose is the DASH (Dynamic Adaptive Streaming over Hypertext Transfer Protocol) technology as specified in ISO/IEC DIS 23009-1.2 (2012). The DASH technology can be applied in various kinds of communication technology, including also wireless communication technologies. Utilization of the DASH technology in the context of a 3GPP (3$^{rd}$ Generation Partnership Project) communication network is for example specified in 3GPP TS 26.247 V13.3.0 (2016 June).

DASH streaming of video and/or audio data can be enhanced by using the SAND (Server and Network Assisted DASH) technology specified in ISO/IEC FDIS 23009-5: 2015 (2015 November). The SAND technology may for example allow for achieving less time to first playout after selecting "Play" at the streaming client, less probability and length of stalling events due to buffer underrun, better network resource utilization, lower power consumption at the streaming client. The SAND technology relies on cooperation of streaming client and a communication network used for delivery of the data. When using the SAND technology, the streaming client may be assisted by nodes of the communication network, referred to as DANE (DASH Aware Network Element). The streaming client can for example request assistance from the DANE on of when and how new segments of the streamed data can be requested, on suitable codec operating point, or the like. The DANE may provide the assistance on the basis of information available in the network, e.g., considering current and expected traffic situation. The streaming client can also send reports to the DANE about its state, buffer size, expected future segment requests or the like, and the DANE may also use this client-specific information as a basis for providing the assistance.

In typical scenarios there may be multiple DANEs which could be used for providing assistance to a certain streaming client, residing in different parts of the communication network, and not all of these DANEs may offer equal performance with respect to optimizing the streaming of data to the streaming client.

Accordingly, there is a need for techniques that allow for efficiently network based assistance for streaming of data.

SUMMARY OF THE INVENTION

According to an embodiment, a method of supporting streaming of data in a communication network is provided. According to the method, a streaming client receives information on a type of node of a node for assisting streaming of data. Depending on the information on the type of node, the streaming client selects the node to assist in streaming of data to the streaming client. The information may thus support the streaming client in selection of an appropriate node for assisting the streaming of the data. This may help the streaming client to make an appropriate selection.

According to an embodiment, the streaming client may send a request and receive the information on the type of node in response to the request. In this way, the streaming client may obtain the information as it is needed by the streaming client. The streaming client may receive the information from the node for assisting streaming of data. However, the streaming client could also receive the information from some other node, e.g., another node for assisting streaming of data or some other network node.

According to an embodiment, the streaming client could also receive the information without requiring sending of a request. For example, the streaming client could receive the information from the node, together with assistance information for assisting the streaming of data to the client. In this case, the selection of the node by the streaming client could involve that the streaming client decides based on the received information on the type of node whether to utilize or disregard the received assistance information.

According to a further embodiment, a method of supporting streaming of data in a communication network is provided. According to the method, a node of the communication network provides information to a streaming client. The information comprises information on a type of node of a node for assisting streaming of data. The information may support the streaming client in selection of an appropriate node for assisting the streaming of the data. This may help the streaming client to make an appropriate selection.

According to an embodiment, the node receives a request, e.g., a request from the streaming client, and sends the information in response to the request. In this way, the streaming client may provide the information as it is needed by the streaming client. However, it is noted that in some scenarios the node could also provide the information in an indirect manner to the streaming client, e.g., by first announcing it to some other node of the communication network, from where it could then be requested by the streaming client. Further, it would also be possible to provide the information without requiring a request by the streaming client, e.g., upon initial interaction of the streaming client and the node.

According to an embodiment, the node could also provide the information without requiring a request from the streaming client. For example, the node could send the information together with assistance information for assisting the streaming of data to the client. In this case, the streaming client could decide based on the received information on the type of node whether to utilize or disregard the received assistance information.

According to a further embodiment, a method of supporting streaming of data in a communication network is provided. According to the method, a streaming client sends a request to a node for assisting streaming of data. The request comprises information on a type of node. Further, the streaming client receives a response to the request. The response depends on whether the node matches the type of node indicated by the information in the request. If the node matches the type of node indicated by the information, the response may be positive. For example, in this case the response could include requested assistance information for assisting the streaming of data to the streaming client or information for setting up a connection between the streaming client and the node. If the node does not match the type of node indicated by the information, the response may be negative and indicate that the node does not match the type of node indicated by the information. Accordingly, the streaming client may issue a request to the node in a conditional manner to thereby obtain requested assistance information only from a certain type of node.

According to a further embodiment, a method of supporting streaming of data in a communication network is provided. According to the method, a node for assisting streaming of data receives a request from a streaming client. The request comprises information on a type of node. Depending on whether the node matches the type of node indicated by the received information, the node sends a response to the request. If the node matches the type of node indicated by the information, the response may be positive. For example, in this case the response could include requested assistance information for assisting the streaming of data to the streaming client or information for setting up a connection between the streaming client and the node. If the node does not match the type of node indicated by the information, the response may be negative and indicate that the node does not match the type of node indicated by the information. Accordingly, requests from the streaming client may be handled in a conditional manner conditional manner to thereby provide requested assistance information only from a certain type of node.

According to a further embodiment, a streaming client is provided. The streaming client comprises an interface to a communication network. Further, the streaming client comprises at least one processor. The at least one processor of the streaming client is configured to receive, via the interface, information on a type of node of a node for assisting streaming of data. Further, the at least one processor of the streaming client is configured to, depending on the information on the type of node, select the node to assist in streaming of data to the streaming client.

According to an embodiment, the at least one processor of the streaming client may be configured to send a request and receive the information on the type of node in response to the request. The information may be received from the node for assisting streaming of data. However, the information could also be received from some other node, e.g., another node for assisting streaming of data or some other network node.

According to an embodiment, the at least one processor of the streaming client could also be configured to receive the information without requiring sending of a request. For example, the at least one processor of the streaming client could be configured to receive the information from the node, together with assistance information for assisting the streaming of data to the client. In this case, the at least one processor of the streaming client could be configured to perform the selection of the node by deciding, based on the received information on the type of node, whether to utilize or disregard the received assistance information.

According to a further embodiment, a node for a communication network is provided. The node comprises an interface to a streaming client. Further, the node comprises at least one processor. The at least one processor of the node is configured to provide information via the interface to the streaming client. The information comprises information on a type of node of a node for assisting streaming of data.

According to an embodiment, the at least one processor of the node may be configured to receive a request, e.g., a request from the streaming client, and send the information in response to the request. However, it is noted that in some scenarios the at least one processor of the node could also be configured to provide the information in an indirect manner to the streaming client, e.g., by first announcing it to some other node of the communication network, from where it could then be requested by the streaming client. Further, the at least one processor of the node could also be configured to provide the information without requiring a request by the streaming client, e.g., upon initial interaction of the streaming client and the node.

According to an embodiment, the at least one processor of the node could also provide the information without requiring a request from the streaming client. For example, the at least one processor of the node could be configured to send the information together with assistance information for assisting the streaming of data to the client. In this case, the streaming client could decide based on the received information on the type of node whether to utilize or disregard the received assistance information.

According to a further embodiment, a system is provided. The system comprises a streaming client and a node of a communication network. The streaming client is configured to receive information on a type of node of a node for assisting streaming of data. The node is configured to provide information to the streaming client, e.g., in response to a request from the streaming client. Further, the streaming client is configured to, depending on the information on the type of node, select the node to assist in streaming of data to the streaming client.

According to a further embodiment, a streaming client is provided. The streaming client comprises an interface to a communication network. Further, the streaming client comprises at least one processor. The at least one processor of the streaming client is configured to send, via the interface, a request to a node for assisting streaming of data. The request comprises information on a type of node. Further, the at least one processor of the streaming client is configured to receive, via the interface, a response to the request. The response depends on whether the node matches the type of node indicated by the received information.

According to a further embodiment, a node for a communication network is provided. The node comprises an interface to a streaming client. Further, the node comprises at least one processor. The at least one processor of the node is configured to receive, via the interface, a request from the streaming client. The request comprises information on a type of node. Further, the at least one processor of the node is configured to, depending on whether the node matches the type of node indicated by the received information, send a response to the request.

According to a further embodiment, a system is provided. The system comprises a streaming client and a node for assisting streaming of data. The streaming client is configured to send a request to the node and to receive a response to the request. The request comprises information on a type of node. The node is configured to send the response to the streaming client. The response depends on whether the node matches the type of node indicated by the received information.

In the above embodiments of a method, streaming client, node, or system, the type of node may be defined in terms of a position of the node within the communication network. The position may be defined by a type of a network domain including the node. For example, the position could indicate whether the node is located in a content provider domain of the communication network, in a content delivery network domain of the communication network, in a transport network domain of the communication network, in a cellular network domain of the communication network, or in an access network domain of the communication network. Further, the information on the type of node may indicate whether the node is a content server, a transport network node, a cellular network node, and/or an access network node. These types of node may differ with respect to their ability for providing assistance information for the streaming of data. Further, the type of node could be defined in terms of a capability of the node. For example, such capability could be defined in terms of one or more types of service supported by the node, i.e., the type of node could also be defined in terms of a type of service the node can provide assistance for. For example, the type of service could indicate whether the node can assist the streaming of a specific type of streaming data, e.g., for multimedia playback applications, virtual reality, gaming, industrial control systems, or software updates. Further, the type of node could also be defined in terms of one or more types of assistance information which can be provided by the node, e.g., information related to network policies or information related to different types of observed or expected network characteristics, such as data rates, data latency, or network load. The streaming client may benefit from the information on the type of node when selecting an appropriate node for requesting a certain type of assistance information. For example, if the streaming client is connected via a cellular network access to the communication network, a node in the cellular network domain of the communication network could be the most appropriate to provide the assistance information. Further, if the streaming client needs a certain type of assistance information, such as information on network policies, it would be appropriate to select a node which is capable of providing this type of assistance information.

Further, in the above embodiments of a method, streaming client, node, or system, the streaming of data may be based on DASH and the node may be a DANE. Accordingly, the information on the type of node may distinguish between different types of DANE, which enables the streaming client to obtain the assistance information from the most appropriate type of DANE. However, it is noted that other streaming technologies could be utilized as well.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

Figure 1:
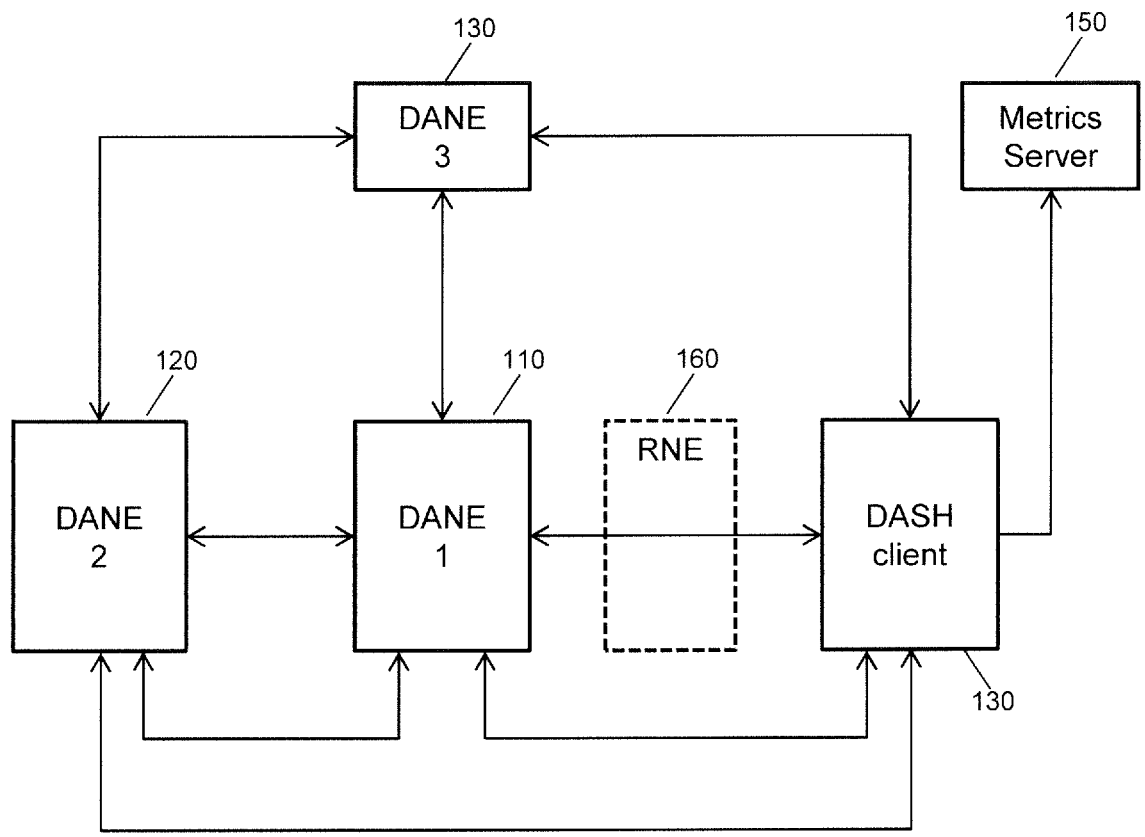
FIG. 1 schematically illustrates a streaming architecture according to an embodiment of the invention.

The illustrated embodiments relate to streaming of data in a communication network, in particular to efficiently enabling of assistance for the streaming by one or more nodes of the communication network. In the examples as further explained in the following, it will be assumed that the streaming of data is based on the SAND technology, i.e., uses the DASH technology with support by one or more DANEs. FIG. 1 illustrates a corresponding streaming architecture which is based on a reference architecture described in ISO/IEC FDIS 23009-5:2015.

In the architecture of FIG. 1, a streaming client 100, also referred to as DASH client, may interact with multiple different DANEs 110, 120, 130. Further, the streaming client 100 may also provide reports to a metrics server 150. In the example of FIG. 1, the DANE 110 is assumed to reside in a content delivery network (CDN) domain of the communication network. The DANE 120 is assumed to reside at a media origin domain. The DANE 130 may in turn reside in an access network domain of the communication network, e.g., in a access network part of a cellular network through which the streaming client 100 accesses the communication network. As further illustrated, the communication network may also include one or more RNEs (regular network elements) 160 which do not support the SAND technology, but may for example be otherwise involved in conveying the streamed data segments.

The streaming client 100 may be implemented by various kinds of user end device, such as a UE (user equipment) supporting one or more wireless communication technologies, a portable or stationary computer, a game console, or a multimedia device, such as a TV, streaming box, or streaming stick. The DANEs 110, 120, 130 may be implemented by various kinds of network elements, such as servers, gateways, routers, switches, or control nodes.

The interaction of the streaming client with each of the DANEs 110, 120, 130 may involve sending status messages from the streaming client 100 to the DANE 110, 120, 130 and sending PER (Parameters Enhancing Reception) messages from the DANE 110, 120, 130 to the streaming client. The status messages may be embedded in HTTP (Hypertext Transfer Protocol) requests, in particular HTTP POST messages. The PER messages may be embedded in HTTP responses, in particular in responses to HTTP GET messages.

As further illustrated, at least some of the DANEs 110, 120, 130 may also interact with each other. The interaction between different DANEs 110, 120, 130 may involve sending PED (Parameters Enhancing Delivery) messages from one DANE 110, 120, 130 to the other. The PED messages may be embedded in HTTP requests, in particular HTTP POST messages.

Each DANE 110, 120, 130 may assist the streaming of data to the streaming client 100 by providing assistance information to the streaming client 100. This assistance information may include information on suitable timing for requesting segments of the streamed data so as to achieve optimized filling of a buffer in of the streaming client 100. Further, the assistance information may include information on current, QoS (Quality of Service) information or expected throughput characteristics for the delivery of the data to the streaming client, which may be used by the streaming client for choosing a suitable codec operating point.

In the illustrated concepts, it is assumed that there may be different types of DANEs in the communication network, such as the DANEs 110, 120, 130 and that these different types of DANE also differ with respect to their capability to provide assistance information to the streaming client 100. Accordingly, it is desirable that the streaming client 100 obtains the assistance information from the most appropriate DANE 110, 120, 130. For example, a DANE in the content delivery network domain, such as the DANE 120, may indicate certain QoS information, e.g., an achievable data rate, or segment availability to the streaming client 100. This assistance information would be based on the traffic situation in the content delivery network domain, but not consider any bottlenecks which may be present elsewhere in the path of the segments to the streaming client 100, e.g., in a radio access network used for connecting the streaming client 100 to the communication network. While the real data rate bottle neck is somewhere else within the communication path to the client. Accordingly, the streaming client 100 might prefer to receive this assistance information rather from a DANE of a type which resides in the radio access network domain, such as the DANE 130.

In the embodiments described herein, information on the type of DANE is used for enabling more efficient utilization of assistance information by the DANEs. The information on the type of node may be conveyed in a message transmitted from the streaming client 100 and/or in a message to the streaming client 100. The streaming client 100 may decide to obtain the assistance information only from one or more selected DANEs 110, 120, 130, which are of a preferred type. Further, the streaming client 100 may decide to disregard the assistance information received from certain DANEs 110, 120, 130, which based on their type are considered to provide less relevant assistance information. The streaming client 100 could thus give the assistance information from one DANE 110, 120, 130 higher priority than the assistance information from another DANE 110, 120, 130, e.g., by disregarding assistance information of low relevance.

The different types of DANE 110, 120, 130 may be distinguished based on where in the architecture of the communication network the DANE 110, 120, 130 resides. For example, the communication network could be organized in different domains which differ with respect to their functionality within the communication network. For example, such domains may include one or more content provider domains, one or more content delivery network domains, one or more transport network domains, and one or more access network domains. The access network domains could be based on a cellular network based access technologies, such as the LTE technology specified by 3GPP, other wireless access technologies, such as WLAN (Wireless Local Area Network), or wire based access technologies, such as DSL (Digital Subscriber Line), coaxial cable, or optical cable technologies. Specific examples of DANE types could for example include a DANE implemented by a content server, a DANE implemented by a transport network node, such as a router or switch, a DANE implemented by a cellular network node, such as an MME (Mobility Management Entity) or PCRF (Policy and Charging Rules Function) of the LTE technology, or a DANE implemented by an access network node, such as a gateway or a cellular base station or WLAN access point.

The information on the DANE type may be utilized in various ways in the interaction between the streaming client 100 and the communication network, typically by including information on the DANE type into a message to or from the streaming client 100. Examples of how the information on the DANE type may be utilized will now be explained with reference to FIGS. 2, 3, and 4.

Figure 2:
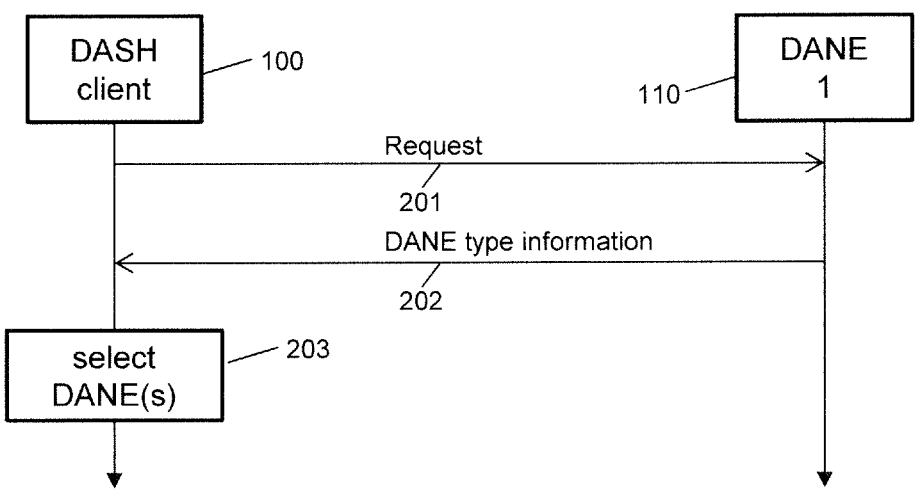
FIG. 2 schematically illustrates an example of processes according to an embodiment of the invention.

FIG. 2 shows exemplary processes which involve the streaming client 100 and a node of the communication network, in the illustrated example the DANE 110. However, it is noted that similar processes could also be implemented between the streaming client 100 and another DANE, such as one of the DANEs 120, 130, or between the streaming client 100 and some other node of the communication network, e.g., an RNE.

In the processes of FIG. 2, the streaming client 100 sends a request 201 to the DANE 110. The request 201 may be dedicated to the purpose of obtaining information on DANE type. However, the request 201 may also have other purposes, e.g., configuring communication between the streaming client 100 and the DANE 110. By the request 201, the streaming client 100 may request information on the DANE type of the DANE 110. Alternatively or in addition, the streaming client 100 could also send the request 201 to request information on the DANE type of other DANEs, such as the DANEs 120, 130, if such information is available at the DANE 110. The request 201 could be conveyed in a SAND message, such as a status message. However, other messages could be used as well for conveying the request 201, e.g., an HTTP message.

The DANE 110 responds to the request 201 by sending DANE type information 202. The DANE type information 202 may indicate the DANE type of the DANE 110. However, the DANE type information 202 could alternatively or in addition also indicate the DANE type of one or more other DANEs, such as the DANEs 110, 130. The DANE type information 202 could be conveyed in a SAND message, such as a PER message. However, other messages could be used as well for conveying the DANE type information 202, e.g., an HTTP message.

As illustrated by block 203, the streaming client 100 may utilize the received the DANE type information 202 for selection of one or more DANEs to be utilized for assisting the streaming of data to the streaming client 100. This may involve requesting assistance information only from some of the available DANEs, which are considered to be preferred on the basis of the indicated DANE types. Further, this may involve disregarding assistance information received from non-preferred DANEs.

Figure 3:
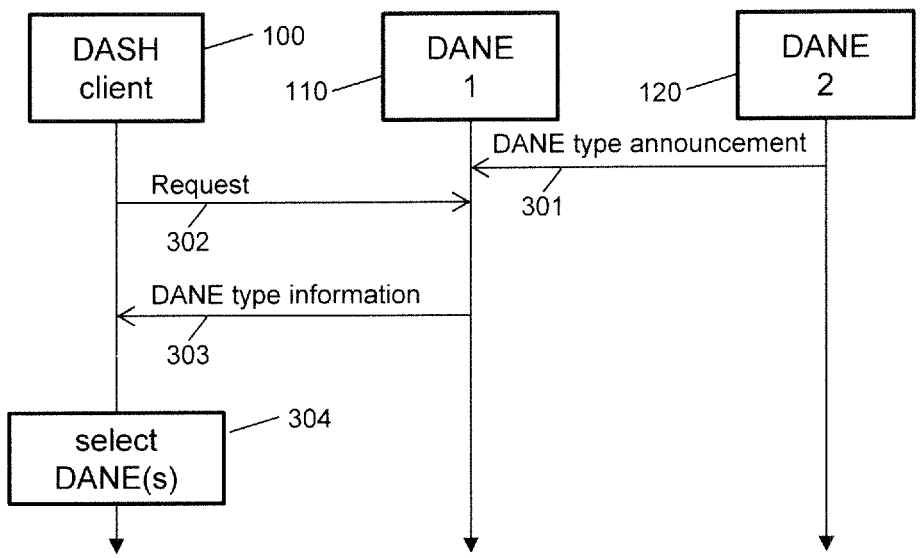
FIG. 3 schematically illustrates a further example of processes according to an embodiment of the invention.

FIG. 3 shows exemplary processes which involve the streaming client 100 and multiple nodes of the communication network, in the illustrated example the DANEs 110, 120, of which one node is responsible for collecting DANE type information.

In the processes of FIG. 3, the DANE 120 sends a DANE type announcement 301 to the DANE 110. The DANE type announcement 301 includes DANE type information indicating the DANE type of the DANE 120. In some scenarios, the DANE type information in the DANE type announcement 301 could further indicate the DANE type of one or more other DANEs. The DANE type announcement 301 may thus be utilized for propagating DANE type information within the communication network. The DANE type announcement 301 could be conveyed in a SAND message, such as a PED message. However, other messages could be used as well for conveying the DANE type announcement 301, e.g., an HTTP message.

The streaming client 100 then sends a request 302 to the DANE 110. The request 302 may be dedicated to the purpose of obtaining information on DANE type. However, the request 302 may also have other purposes, e.g., configuring communication between the streaming client 100 and the DANE 110. By the request 302, the streaming client 100 may request information on DANE types as available at the DANE 110, including the DANE type of the DANE 110 and information on the DANE type of other DANEs, such as the DANEs 120, 130. In the illustrated example, it is assumed that the DANE 110 has information on its own DANE type and information on the DANE type of the DANE 120 from the DANE type announcement 301. The request 302 could be conveyed in a SAND message, e.g., such as a status message. However, other messages could be used as well for conveying the request 302, e.g., an HTTP message.

The DANE 110 responds to the request 302 by sending DANE type information 303. The DANE type information 303 indicates the DANE type of the DANE 110 and the DANE type of the DANE 120. The DANE type information 303 could be conveyed in a SAND message, e.g., such as a PER message. However, other messages could be used as well for conveying the DANE type information 303, e.g., an HTTP message.

As illustrated by block 304, the streaming client 100 may utilize the received the DANE type information 303 for selection of one or more DANEs to be utilized for assisting the streaming of data to the streaming client 100. This may involve requesting assistance information only from some of the available DANEs, which are considered to be preferred on the basis of the indicated DANE types. Further, this may involve disregarding assistance information received from non-preferred DANEs.

It is noted that in modified versions of the processes of FIGS. 2 and 3, the streaming client 100 could also receive the DANE type information 202 or 303 without requiring that the streaming client first sends a corresponding request. For example, the DANE 110 could send the DANE type information 202, 303 upon initial registration of the streaming client 100 in the communication network. Further, the DANE 110 could send the DANE type information 202 in a regular message for updating the streaming client 100 with information on available DANEs.

Figure 4:
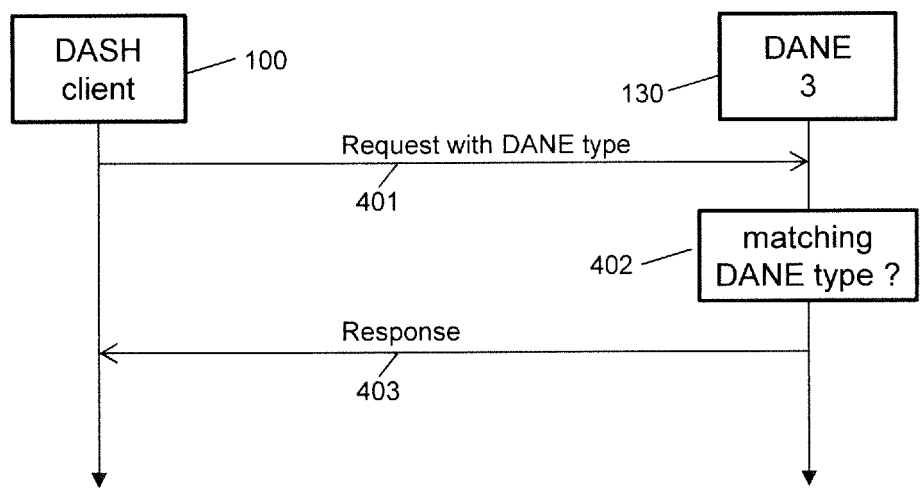
FIG. 4 schematically illustrates a further example of processes according to an embodiment of the invention.

FIG. 4 shows exemplary processes which involve the streaming client 100 and a DANE, in the illustrated example the DANE 130. However, it is noted that similar processes could also be implemented between the streaming client 100 and another DANE, such as one of the DANEs 110, 120.

In the processes of FIG. 4, the streaming client 100 sends a request 401 to the DANE 130. The request 401 may for example have the purpose of setting up communication between the streaming client 100 and the DANE 130 or the purpose of obtaining certain assistance information from the DANE 130. For example, the message could be a request for identification of the DANE 130 or for connection with the DANE 130.

The request 401 further includes DANE type information indicating a DANE type preferred by the streaming client 100. The request 401 could be conveyed in a SAND message, such as a status message. However, other messages could be used as well for conveying the request 201, e.g., an HTTP message.

As indicated by block 402, the DANE 130 then checks whether it matches the DANE type indicated in the request 401. Depending on the outcome of the check, the DANE 130 sends a response 403 to the streaming client 100. For example, if the DANE 130 matches the DANE type indicated in the request 401, the response 403 may be a positive response which includes information as requested by the request 401, e.g., information for setting up communication between the streaming client 100 and the DANE 130, e.g., a connection identity of the DANE 130, such as an IP (Internet Protcol) address or WebSocket URI (Uniform Resource Identifier). Alternatively, or in addition, the response 403 could also include requested assistance information. If the DANE 130 matches the DANE type indicated in the request 401, the response 403 may be a negative response which indicates that the request 401 is denied because the DANE 130 is not of the Dane type indicated in the request 401.

As can be seen, the processes of FIG. 4 may be used by the streaming client 100 to exclusively address DANEs which are of a specific DANE type. In some scenarios, the streaming client 100 could also send the request 401 to multiple DANEs, e.g., using a multicast transmission mode, and receive positive responses only from those DANEs which match the DANE type indicated in the request 401.

It is noted that in some scenarios processes like illustrated in FIGS. 2 and 3 could also be combined with processes like illustrated in FIG. 4. For example, the streaming client could send a request and indicate a preferred DANE type in the request, like in the example of FIG. 4, and a response to this request could include DANE type information, like in the examples of FIGS. 2 and 3, e.g., DANE type information indicating one or more DANEs of the DANE type indicated in the request and optionally also one or more DANEs of other DANE type.

Figure 5:
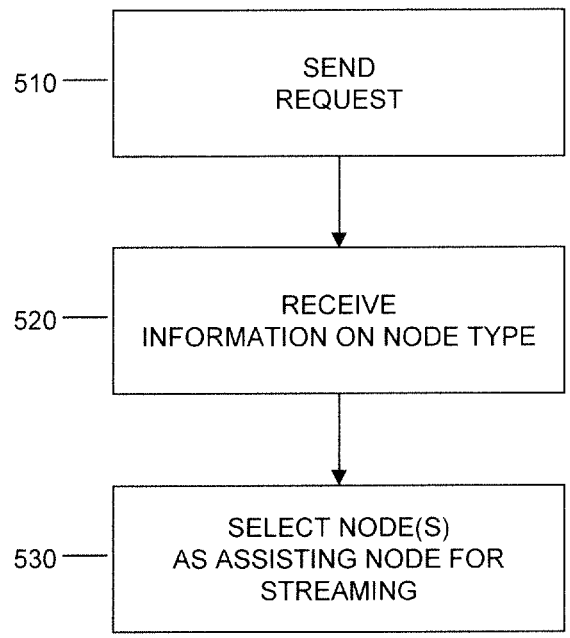
FIG. 5 shows a flowchart for illustrating a method according to an embodiment of the invention, which may be implemented by a streaming client.

FIG. 5 shows a flowchart illustrating a method which for supporting streaming of data in a communication network, in particular streaming of data to a streaming client, such as the above-mentioned streaming client 100. The method of FIG. 5 may be implemented by the streaming client, such as the above-mentioned streaming client 100. If a processor based implementation of the streaming client is utilized, at least a part of the steps of the method may be performed and/or controlled by one or more processors of the streaming client.

The streaming of data may be based on DASH, and the streaming client may thus be configured as a DASH client. In this case, the streaming of data may be assisted by one or more DANEs based on the SAND technology. However, it is noted that other streaming technologies could be utilized as well, such as HTTP Live Streaming (HLS) or HTTP Dynamic Streaming (HDS), and/or other types of assisting nodes could be utilized.

At step 510, the streaming client may send a request. Examples of such request are the above-mentioned requests 201 and 302. If the streaming of data is DASH based, the request could be sent to a DANE. However, the request could also be sent to other types of nodes in the communication network, e.g., to an RNE. The request may be conveyed in or correspond to a SAND message. However, other message types could be utilized as well.

At step 520, the streaming client receives information on a type of node of a node for assisting streaming of data. If the streaming of data is DASH based, this node may correspond to a DANE, such as one of the above-mentioned DANEs 110, 120, 130. The information on the type of node may then correspond to information on the DANE type of the DANE. However, other types of assisting nodes could be utilized as well.

The streaming client may receive the information from the node for assisting streaming of data. However, the streaming client could also receive the information from some other node, e.g., another node for assisting streaming of data or some other network node.

The streaming client may receive the information on the type of node in response to the request of step 510. However, it is noted sending of the request at step 510 is optional and that in some scenarios the streaming client may receive the information without requiring sending of a request. For example, the streaming client could receive the information on the type of node together with other information from the node, e.g., together with assistance information for assisting the streaming of data to the streaming client. Further, the streaming client could receive the information on the type of node in the course of a registration process or as part of regularly transmitted update information concerning available nodes for assisting the streaming of data.

The type of node may be defined in terms of a position of the node within the communication network. The position may be defined by a type of a network domain including the node. For example, the position could indicate whether the node is located in a content provider domain of the communication network, a content delivery network domain of the communication network, in a transport network domain of the communication network, in a cellular network domain of the communication network, or in an access network domain of the communication network. Further, the information on the type of node may indicate whether the node is a content server, a transport network node, a cellular network node, and/or an access network node. Further, the type of node could be defined in terms of a capability of the node. For example, such capability could be defined in terms of one or more types of service supported by the node. In other words, the type of node could also be defined in terms of a type of service the node can provide assistance for. For example, the type of service could indicate whether the assistance information can include support for a specific type of streaming data, e.g., for multimedia playback applications, virtual reality, gaming, industrial control systems, or software updates. Further, the type of node could also be defined in terms of one or more types of assistance information which can be provided by the node, e.g., information related to network policies or information related to different types of observed or expected network characteristics, such as data rates, data latency, or network load.

At step 530, the streaming client selects the node to assist in streaming of data to the streaming client. This is accomplished depending on the information on the type of node received at step 520. For example, if the information on the type of node indicates that the node is of a preferred type, the streaming client may select the node as node for assisting the streaming of data and obtain assistance information from the node. Further, if the information on the type of node indicates that the node is of a non-preferred type, the streaming client may disregard assistance information received from this node or maybe even refrain from obtaining assistance information from this node. The assistance information may for example include timing information concerning the availability of segments of the streamed data or QoS or throughput information which enables the streaming client to optimize codec settings of a multimedia component of the streamed data.

Figure 6:
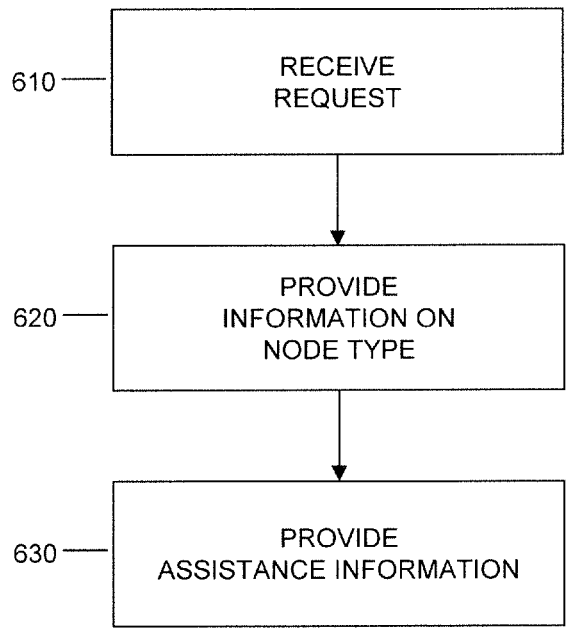
FIG. 6 shows a flowchart for illustrating a further method according to an embodiment of the invention, which may be implemented by a network node.

FIG. 6 shows a flowchart illustrating a method which for supporting streaming of data in a communication network, in particular streaming of data to a streaming client, such as the above-mentioned streaming client 100. The method of FIG. 6 may be implemented by a node of the communication network. If a processor based implementation of the node is utilized, at least a part of the steps of the method may be performed and/or controlled by one or more processors of the node.

The streaming of data may be based on DASH, and the streaming client may thus be configured as a DASH client. In this case, the streaming of data may be assisted by one or more DANEs based on the SAND technology, such as one of the above-mentioned DANEs 110, 120, 130. The node may then correspond to one of these DANEs. However, it is noted that other streaming technologies could be utilized as well, such as HLS or HDS, and/or other types of assisting nodes could be utilized. Further, the node could also correspond to some other node than an assisting node, such as one of the above-mentioned RNEs 160.

At step 610, the node may receive a request. Examples of such request are the above-mentioned requests 201 and 302. The request may be conveyed in or correspond to a SAND message. However, other message types could be utilized as well.

At step 620, the node provides information on a type of node of a node for assisting streaming of data to the streaming client. If the streaming of data is DASH based, this node may correspond to a DANE, such as one of the above-mentioned DANEs 110, 120, 130. The information on the type of node may then correspond to information on the DANE type of the DANE. However, other types of assisting nodes could be utilized as well. In some scenarios, the information on the type of node may include information on the type of node of the node itself.

The node may send the information on the type of node in response to the request of step 620. However, it is noted that receiving of the request at step 610 is optional and that in some scenarios the node may provide the information without requiring a request from the streaming client. For example, the node could send the information on the type of node together with other information from the node, e.g., together with assistance information for assisting the streaming of data to the streaming client. Further, the node could send the information on the type of node in the course of a registration process or as part of regularly transmitted update information concerning available nodes for assisting the streaming of data. Further, the node could also provide the information on the type of node indirectly to the streaming client, such as by the above-mentioned DANE type announcement 301.

The type of node may be defined in terms of a position of the node within the communication network. The position may be defined by a type of a network domain including the node. For example, the position could indicate whether the node is located in a content provider domain of the communication network, a content delivery network domain of the communication network, in a transport network domain of the communication network, in a cellular network domain of the communication network, or in an access network domain of the communication network. Further, the information on the type of node may indicate whether the node is a content server, a transport network node, a cellular network node, and/or an access network node. Further, the type of node could be defined in terms of a capability of the node. For example, such capability could be defined in terms of one or more types of service supported by the node. In other words, the type of node could also be defined in terms of a type of service the node can provide assistance for. For example, the type of service could indicate whether the assistance information can include support for a specific type of streaming data, e.g., for multimedia playback applications, virtual reality, gaming, industrial control systems, or software updates. Further, the type of node could also be defined in terms of one or more types of assistance information which can be provided by the node, e.g., information related to network policies or information related to different types of observed or expected network characteristics, such as data rates, data latency, or network load.

At step 630, the node may provide assistance information to the streaming client. The assistance information may for example include timing information concerning the availability of segments of the streamed data or QoS or throughput information which enables the streaming client to optimize codec settings of a multimedia component of the streamed data.

It is to be understood that the methods of FIGS. 5 and 6 may also be combined, e.g., in a system including at least one streaming client operating according to the method of FIG. 5 and at least one node operating according to the method of FIG. 6.

Figure 7:
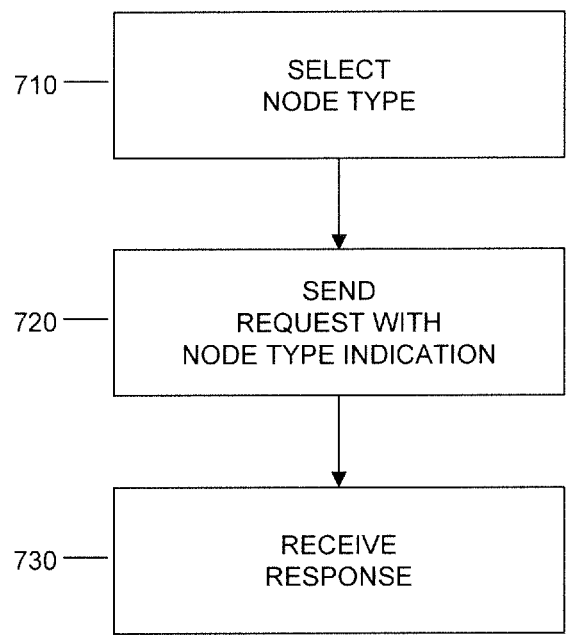
FIG. 7 shows a flowchart for illustrating a further method according to an embodiment of the invention, which may be implemented by a streaming client.

FIG. 7 shows a flowchart illustrating a method which for supporting streaming of data in a communication network, in particular streaming of data to a streaming client, such as the above-mentioned streaming client 100. The method of FIG. 7 may be implemented by the streaming client, such as the above-mentioned streaming client 100. If a processor based implementation of the streaming client is utilized, at least a part of the steps of the method may be performed and/or controlled by one or more processors of the streaming client.

The streaming of data may be based on DASH, and the streaming client may thus be configured as a DASH client. In this case, the streaming of data may be assisted by one or more DANEs based on the SAND technology. However, it is noted that other streaming technologies could be utilized as well, such as HLS or HDS, and/or other types of assisting nodes could be utilized.

At step 710, the streaming client may select a type of node of a node for assisting the streaming of data to the streaming client. The type of node may for example correspond to a preferred type of node, for which the streaming client expects the best performance with respect to assisting the streaming of data.

At step 720, the streaming client sends a request to a node for assisting streaming of data. An example of such request is the above-mentioned request 401. If the streaming of data is DASH based, the request could be sent to a DANE such as one of the above-mentioned DANEs 110, 120, 130. The request may then be conveyed in or correspond to a SAND message. However, other types of assisting nodes could be utilized as well. The request includes information on a type of node, e.g., the information on the type of node as selected at step 710.

The type of node may be defined in terms of a position of the node within the communication network. The position may be defined by a type of a network domain including the node. For example, the position could indicate whether the node is located in a content provider domain of the communication network, a content delivery network domain of the communication network, in a transport network domain of the communication network, in a cellular network domain of the communication network, or in an access network domain of the communication network. Further, the information on the type of node may indicate whether the node is a content server, a transport network node, a cellular network node, and/or an access network node. Further, the type of node could be defined in terms of a capability of the node. For example, such capability could be defined in terms of one or more types of service supported by the node. In other words, the type of node could also be defined in terms of a type of service the node can provide assistance for. For example, the type of service could indicate whether the assistance information can include support for a specific type of streaming data, e.g., for multimedia playback applications, virtual reality, gaming, industrial control systems, or software updates. Further, the type of node could also be defined in terms of one or more types of assistance information which can be provided by the node, e.g., information related to network policies or information related to different types of observed or expected network characteristics, such as data rates, data latency, or network load.

At step 730, the streaming client receives a response to the request. The response depends on whether the node matches the type of node indicated by the information in the request of step 720. If the node matches the type of node indicated by the information, the response may be positive. For example, in this case the response could include requested assistance information for assisting the streaming of data to the streaming client or information for setting up a connection between the streaming client and the node. The assistance information may for example include timing information concerning the availability of segments of the streamed data or QoS or throughput information which enables the streaming client to optimize codec settings of a multimedia component of the streamed data. The information for setting up the connection may for example include a connection identifier of the node, such as an IP address or WebSocket URI. If the node does not match the type of node indicated by the information, the response may be negative and indicate that the node does not match the type of node indicated by the information.

Figure 8:
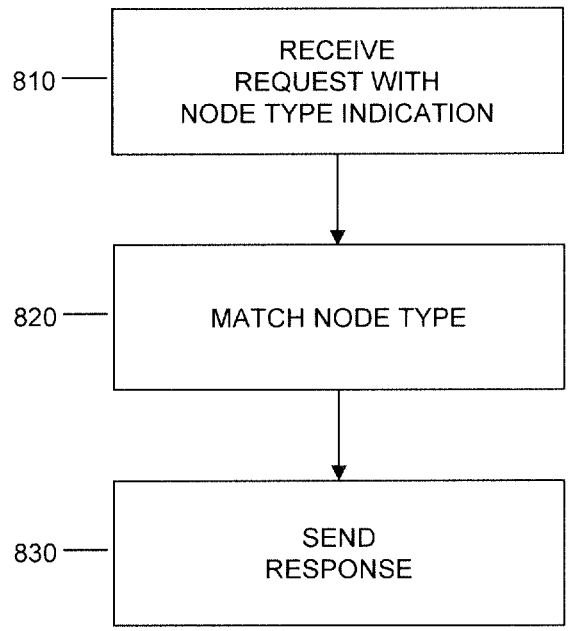
FIG. 8 shows a flowchart for illustrating a further method according to an embodiment of the invention, which may be implemented by a network node.

FIG. 8 shows a flowchart illustrating a method which for supporting streaming of data in a communication network, in particular streaming of data to a streaming client, such as the above-mentioned streaming client 100. The method of FIG. 8 may be implemented by a node of the communication network, specifically by a node for assisting the streaming of data. If a processor based implementation of the node is utilized, at least a part of the steps of the method may be performed and/or controlled by one or more processors of the node.

The streaming of data may be based on DASH, and the streaming client may thus be configured as a DASH client. In this case, the streaming of data may be assisted by one or more DANEs based on the SAND technology, such as one of the above-mentioned DANEs 110, 120, 130. The node may then correspond to one of these DANEs. However, it is noted that other streaming technologies could be utilized as well, such as HLS or HDS, and/or other types of assisting nodes could be utilized.

At step 810, the node receives a request from the streaming client. An example of such request is the above-mentioned request 401. If the streaming of data is DASH based, the request could be sent to a DANE such as one of the above-mentioned DANEs 110, 120, 130. The request may then be conveyed in or correspond to a SAND message.

However, other types of assisting nodes could be utilized as well. The request includes information on a type of node, e.g., information on a type of node preferred by the streaming client.

The type of node may be defined in terms of a position of the node within the communication network. The position may be defined by a type of a network domain including the node. For example, the position could indicate whether the node is located in a content provider domain of the communication network, a content delivery network domain of the communication network, in a transport network domain of the communication network, in a cellular network domain of the communication network, or in an access network domain of the communication network. Further, the information on the type of node may indicate whether the node is a content server, a transport network node, a cellular network node, and/or an access network node. Further, the type of node could be defined in terms of a capability of the node. For example, such capability could be defined in terms of one or more types of service supported by the node. In other words, the type of node could also be defined in terms of a type of service the node can provide assistance for. For example, the type of service could indicate whether the assistance information can include support for a specific type of streaming data, e.g., for multimedia playback applications, virtual reality, gaming, industrial control systems, or software updates. Further, the type of node could also be defined in terms of one or more types of assistance information which can be provided by the node, e.g., information related to network policies or information related to different types of observed or expected network characteristics, such as data rates, data latency, or network load.

At step 820, the node checks whether the node matches the type of node indicated by the information in the received request. For this purpose, the node may compare information on its own type of node to the information received in the request of step 810.

At step 830, the streaming client sends a response to the request. The response depends on the check of step 820, i.e., on whether the node matches the type of node indicated by the information in the request received at step 810. If the node matches the type of node indicated by the information, the response may be positive. For example, in this case the response could include requested assistance information for assisting the streaming of data to the streaming client or information for setting up a connection between the streaming client and the node. The assistance information may for example include timing information concerning the availability of segments of the streamed data or QoS or throughput information which enables the streaming client to optimize codec settings of a multimedia component of the streamed data. The information for setting up the connection may for example include a connection identifier of the node, such as an IP address or WebSocket URI. If the node does not match the type of node indicated by the information, the response may be negative and indicate that the node does not match the type of node indicated by the information.

It is to be understood that the methods of FIGS. 7 and 8 may also be combined, e.g., in a system including at least one streaming client operating according to the method of FIG. 7 and at least one node operating according to the method of FIG. 8.

Figure 9:
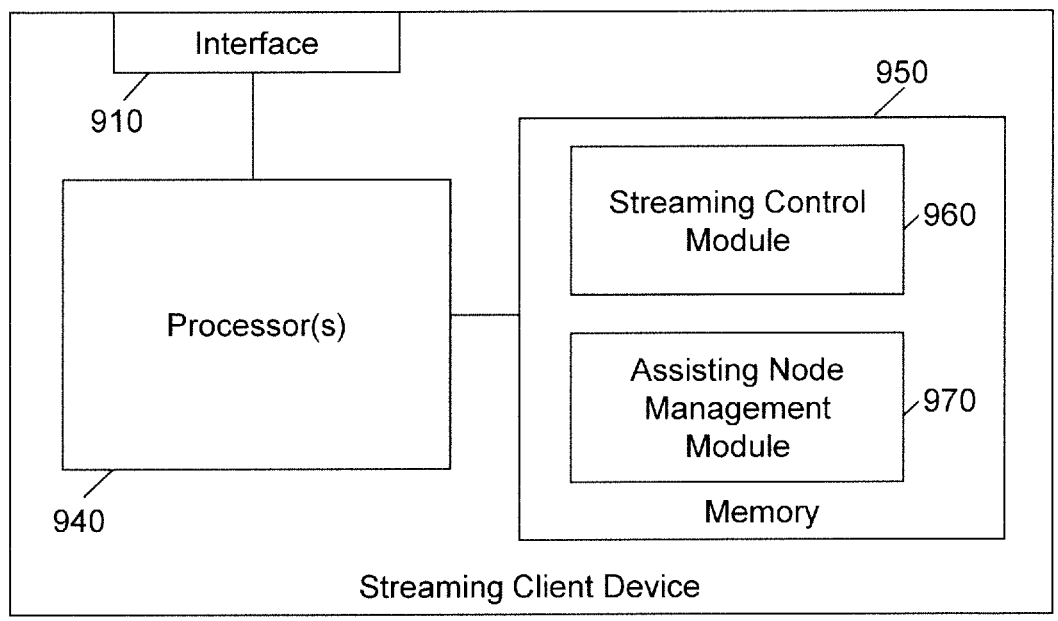
FIG. 9 schematically illustrates a processor-based implementation of a streaming client according to an embodiment of the invention.

FIG. 9 shows a block diagram for schematically illustrating a processor based implementation of a streaming client which may be utilized for implementing the above concepts such as the above-mentioned streaming client 100.

As illustrated, the streaming client includes an interface 810. The streaming client may utilize the interface 910 for connecting to a communication network and for receiving streamed data from the communication network.

Further, the streaming client is provided with one or more processors 940 and a memory 950. The interface 910 and the memory 950 are coupled to the processor(s) 940, e.g., using one or more internal bus systems of the streaming client.

The memory 950 includes program code modules 960, 970 with program code to be executed by the processor(s) 940. In the illustrated example, these program code modules include a streaming control module 960 and an assisting node management module 970.

The communication control module 960 may implement functionalities for controlling streaming of data, e.g., by controlling requesting of segments of the streamed data. The assisting node management module 970 may implement the above-described functionalities of selecting one or more assisting nodes, e.g., according to the method of FIG. 5 and/or the method of FIG. 7.

It is to be understood that the structures as illustrated in FIG. 9 are merely exemplary and that the streaming client may also include other elements which have not been illustrated, e.g., structures or program code modules for implementing known functionalities of a DASH client or other type of streaming client.

Figure 10:
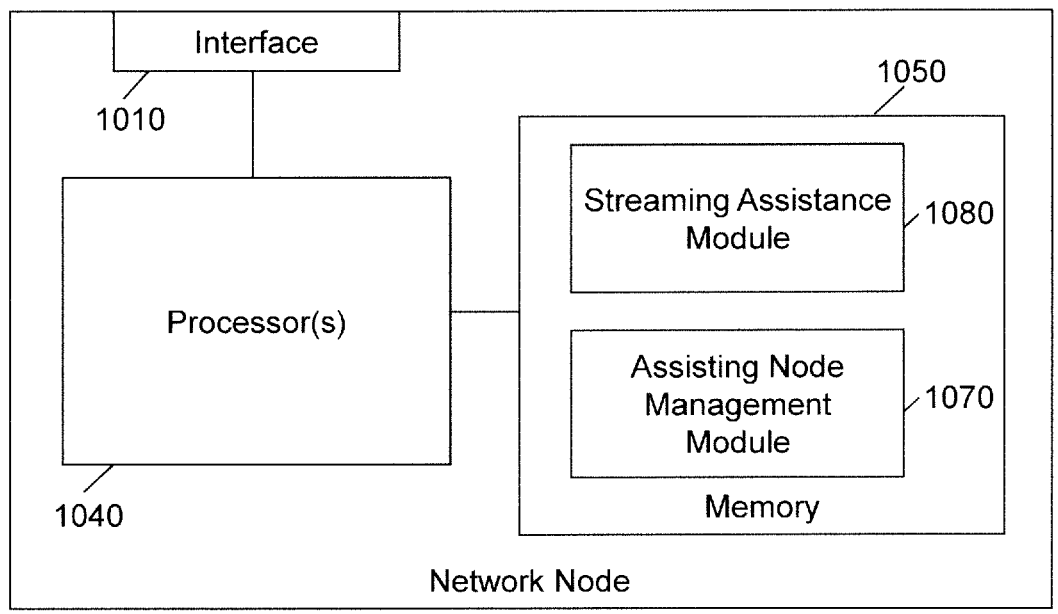
FIG. 10 schematically illustrates a processor-based implementation of a network node according to an embodiment of the invention.

FIG. 10 shows a block diagram for schematically illustrating a processor based implementation of a network node which may be utilized for implementing the above concepts. The network may for example correspond to one of the above-mentioned DANEs 110, 120, 130 or to some other type of node, such as one of the above-mentioned RNEs.

As illustrated, the node includes an interface 1010. The node may utilize the interface 1010 for connecting to at least one streaming client, e.g., the above-mentioned streaming client 100. If the node is configured for assisting the streaming of data to the streaming client, the interface 1010 may be used for providing the corresponding assistance information to the streaming client. In some scenarios, the node may also be directly involved in conveying segments of the streamed data to the streaming client. In this case, the interface 1010 may also be used for forwarding the segments of the streamed data to the streaming client.

Further, the node is provided with one or more processors 1040 and a memory 1050. The interface 1010 and the memory 1050 are coupled to the processor(s) 1040, e.g., using one or more internal bus systems of the node.

The memory 1050 includes program code modules 1060, 1070 with program code to be executed by the processor(s) 1040. In the illustrated example, these program code modules include a streaming assistance module 1060 and an assisting node management module 1070.

The streaming assistance module 1060 may implement functionalities of assisting the streaming of data, e.g., by determining the corresponding assistance information to be provided to a streaming client. The assisting node management module 1070 may implement the above-described functionalities of enabling the selection of an appropriate assisting node, e.g., according to the method of FIG. 6 and/or the method of FIG. 8.

It is to be understood that the structures as illustrated in FIG. 10 are merely exemplary and that the node may also include other elements which have not been illustrated, e.g., structures or program code modules for implementing known functionalities of a DANE for similar node for assisting streaming of data.

It is to be understood that the concepts as explained above are susceptible to various modifications. For example, the concepts could be applied in connection with various kinds of network technologies and devices. Further, the concepts may be applied in connection with various kinds of streaming technologies, without limitation to the above-mentioned example of the DASH technology and SAND technology. Further, the concepts are not limited to streaming of multimedia data, but could also be applied for conveying other types of data, such as software.

The invention claimed is:

1. A method of supporting streaming of data in a communication network, the method comprising:
 a streaming client receiving information on a type of node of a node for assisting streaming of data, wherein the node is configured to provide assistance information to the streaming client and the type of node corresponds with a type of assistance information;
 depending on the information on the type of node, the streaming client selecting the node to assist in streaming of data to the streaming client;
 the streaming client receiving assistance information from the node; and
 the streaming client utilizing the assistance information for streaming the data.

2. The method according to claim 1,
 wherein the type of node is defined in terms of a position of the node within the communication network.

3. The method according to claim 1,
 wherein the information on the type of node indicates whether the node is a content server, a transport network node, a cellular network node, and/or an access network node.

4. The method according to claim 1,
 wherein the information on the type of node is defined in terms of a capability of the node.

5. The method according to claim 1, comprising:
 the streaming client sending a request; and
 the streaming client receiving the information on the type of node in response to the request.

6. The method according to claim 1,
 wherein the streaming of data is based on Dynamic Adaptive Streaming over Hypertext Transfer Protocol (DASH) and,
 wherein the node is a DASH aware network element.

7. A method of supporting streaming of data in a communication network, the method comprising:
 a node of the communication network providing information to a streaming client,
 wherein the information comprises information on a type of node of the node for assisting streaming of data, and the node is configured to provide assistance information to the streaming client and the type of node corresponds with a type of assistance information; and
 the node providing assistance information to the streaming client.

8. The method according to claim 7,
 wherein the type of node is defined in terms of a position of the node within the communication network.

9. The method according to claim 7,
 wherein the information on the type of the node indicates whether the node is a content server, a transport network node, a cellular network node, and/or an access network node.

10. The method according to claim 7,
 wherein the information on the type of node is defined in terms of a capability of the node.

11. The method according to claim 7, comprising:
 the node receiving a request; and
 the node sending the information in response to the request.

12. The method according to claim 7,
 wherein the streaming of data is based on Dynamic Adaptive Streaming over Hypertext Transfer Protocol (DASH) and,
 wherein the node is a DASH aware network element.

13. A method of supporting streaming of data in a communication network, the method comprising:
 a streaming client sending a request to a node for assisting streaming of data by providing assistance information to the streaming client, the request comprising information on a type of node, wherein the type of node corresponds with a type of assistance information;
 the streaming client receiving a response to the request, the response depending on whether the node matches the type of node indicated by the information in the request;
 the streaming client receiving assistance information from the node; and
 the streaming client utilizing the assistance information for streaming the data.

14. The method according to claim 13,
 wherein the type of node is defined in terms of a position of the node within the communication network.

15. The method according to claim 13,
 wherein the information on the type of node indicates whether the node is a content server, a transport network node, a cellular network node, and/or an access network node.

16. The method according to any one of claim 13,
 wherein the information on the type of node is defined in terms of a capability of the node.

17. The method according to claim 13,
 wherein the streaming of data is based on Dynamic Adaptive Streaming over Hypertext Transfer Protocol (DASH) and,
 wherein the node is a DASH aware network element.

18. A method of supporting streaming of data in a communication network, the method comprising:
 a node for assisting streaming of data by providing assistance information to a streaming client receiving a request from the streaming client, the request comprising information on a type of node, wherein the type of node corresponds with a type of assistance information;
 depending on whether the node matches the type of node indicated by the received information, the node sending a response to the request; and
 the node providing assistance information to the streaming client.

19. The method according to claim 18,
 wherein the type of node is defined in terms of a position of the node within the communication network.

20. The method according to claim 18,
 wherein the information on the type of node indicates whether the node is a content server, a transport network node, a cellular network node, and/or an access network node.

21. The method according to claim 18,
 wherein the information on the type of node is defined in terms of a capability of the node.

22. The method according to claim 18,
 wherein the streaming of data is based on Dynamic Adaptive Streaming over Hypertext Transfer Protocol (DASH) and,
 wherein the node is a DASH aware network element.

23. A streaming client, comprising:
an interface to a communication network; and
at least one processor,
the at least one processor being configured to:
  via the interface, receive information on a type of node of a node for assisting streaming of data, wherein the node is configured to provide assistance information to the streaming client and the type of node corresponds with a type of assistance information;
  depending on the information on the type of node, select the node to assist in streaming of data to the streaming client;
  via the interface, receive assistance information from the node; and
  utilize the assistance information for streaming the data.

24. A node for a communication network, the node comprising:
an interface to a streaming client; and
at least one processor,
the at least one processor being configured to:
  via the interface, provide information to the streaming client,
  wherein the information comprises information on a type of node of the node for assisting streaming of data, and the node is configured to provide assistance information to the streaming client and the type of node corresponds with a type of assistance information; and
  via the interface providing assistance information to the streaming client.

25. A streaming client, comprising:
an interface to a communication network; and
at least one processor,
the at least one processor being configured to:
  via the interface, send a request to a node for assisting streaming of data by providing assistance information to the streaming client, the request comprising information on a type of node, wherein the type of node corresponds with a type of assistance information;
  via the interface, receive a response to the request, the response depending on whether the node matches the type of node indicated by the information in the request;
  via the interface, receive assistance information from the node; and
  utilize the assistance information for streaming the data.

26. A node for assisting streaming of data in a communication network by providing assistance information to a streaming client, the node comprising:
an interface to the streaming client; and
at least one processor,
the at least one processor being configured to:
  via the interface, receive a request from the streaming client, the request comprising information on a type of node, wherein the type of node corresponds with a type of assistance information;
  depending on whether the node matches the type of node indicated by the received information, send a response to the request; and
  provide assistance information to the streaming client.

* * * * *